United States Patent
Periyathambi et al.

(10) Patent No.: US 11,798,070 B2
(45) Date of Patent: Oct. 24, 2023

(54) ADAPTIVE TIMING PREDICTION FOR UPDATING INFORMATION

(71) Applicant: eBay Inc., San Jose, CA (US)

(72) Inventors: Ramesh Periyathambi, San Ramon, CA (US); Manojkumar Rangasamy Kannadasan, Fremont, CA (US); Lakshimi Duraivenkatesh, San Ramon, CA (US); Sai Vipin Siripurapu, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 617 days.

(21) Appl. No.: 16/538,612

(22) Filed: Aug. 12, 2019

(65) Prior Publication Data

US 2021/0049679 A1    Feb. 18, 2021

(51) Int. Cl.
  *G06Q 30/08*    (2012.01)
  *G06N 5/02*    (2023.01)

(52) U.S. Cl.
  CPC .............. *G06Q 30/08* (2013.01); *G06N 5/02* (2013.01)

(58) Field of Classification Search
  USPC ........................................................ 705/26.3
  See application file for complete search history.

(56) References Cited

U.S. PATENT DOCUMENTS

| | | | |
|---|---|---|---|
| 5,802,292 A | 9/1998 | Mogul | |
| 8,688,528 B2 | 4/2014 | Leahy et al. | |
| 9,495,702 B2* | 11/2016 | Srivastava | G06Q 30/08 |
| 11,176,589 B2* | 11/2021 | Pyati | G06N 20/00 |
| 2002/0065789 A1 | 5/2002 | Witt | |
| 2002/0120552 A1* | 8/2002 | Grey | G06Q 40/04 705/37 |
| 2003/0018777 A1 | 1/2003 | Miller et al. | |
| 2003/0036975 A1* | 2/2003 | Martin | G06Q 30/08 705/26.3 |
| 2009/0037314 A1* | 2/2009 | Powell | G06Q 30/08 705/37 |

(Continued)

FOREIGN PATENT DOCUMENTS

| KR | 1020030003237 A | 1/2003 |
|---|---|---|
| WO | 0169453 A1 | 9/2001 |

OTHER PUBLICATIONS

Ip.com Disclosure No. IPCOM000258224D Publication Date: Apr. 19, 2019 Publishing Venue: The IP.com Prior Art Database https://ip.com/IPCOM/000258224 (Year: 2019).*

(Continued)

*Primary Examiner* — Michelle T Kringen
(74) *Attorney, Agent, or Firm* — FIG. 1 Patents

(57) ABSTRACT

Technologies are disclosed herein for distributing information. The disclosed technologies determine an application element configured to receive information that is updated at a variable rate, the information pertaining to an object. Feature data is received that is associated with the object and data associated with use of the application element. The feature data includes a time horizon for the object and supplemental information associated with the object. Based on the feature data and the data associated with use of the application element, a first rate is predicted for sending the information about the object to the application element. The information is sent to the application element at the first rate.

20 Claims, 8 Drawing Sheets

(56) References Cited

U.S. PATENT DOCUMENTS

| | | | | |
|---|---|---|---|---|
| 2013/0263169 A1* | 10/2013 | Pedlow | ............. | H04N 21/4882 |
| | | | | 725/16 |
| 2014/0365415 A1* | 12/2014 | Stelfox | ............. | G06K 7/10227 |
| | | | | 706/21 |
| 2018/0349485 A1* | 12/2018 | Carlisle | .............. | G06F 16/9535 |
| 2020/0151815 A1* | 5/2020 | Whitfield | .............. | G06Q 40/04 |
| 2020/0184963 A1* | 6/2020 | Joseph | .................. | G10L 15/30 |

OTHER PUBLICATIONS

Dahlan et al., "Implementation of Asynchronous Predictive Fetch to Improve the Performance of Ajax-Enabled Web Applications," Proceedings of the 10th International Conference on Information Integration and Web-based Applications & Services, Nov. 24-26, 2008, 345-350 pages.

Pardoe et al., "Developing Adaptive Auction Mechanisms," ACM Sigecom Exchanges, vol. 5, Issue 3, Apr. 2005, 1-10 pages.

10-2020-0100741, "Foreign Office Action", KR Application No. 10-2020-0100741, dated Jan. 30, 2023, 10 pages.

Notice of Allowance received for Korean Patent Application No. 10-2020-0100741, dated Jul. 20, 2023, 4 pages.

\* cited by examiner

ADAPTIVE TIMING PREDICTION FOR UPDATING INFORMATION

BACKGROUND

Many users access information that can be updated dynamically. As just one example, bidders on an online auction site or users monitoring the status of a system may access information that may be subject to updates at various times. In such systems, it is desirable to ensure that (1) the source of the information is polled at a rate such that the information does not become stale, and (2) the information is provided to the users in a timely manner. At the same time, it is important to avoid polling/sending the information at a higher rate than is necessary, thus wasting compute capacity and network bandwidth.

It is with respect to these and other technical considerations that the disclosure made herein is presented.

SUMMARY

Many systems that provide updates for dynamically changing information use a static update scheme, such as updating the information at a set frequency. Some systems may increase or decrease the frequency for updating a given parameter, but the frequency is not adaptable for changing conditions or not unique for a particular user or scenario. Various embodiments are disclosed herein for optimizing when and how frequently a dynamically updated information source should be polled and pushed to users of the information. In some embodiments, the optimization may be performed based on the number and types of users, and a number of factors associated with the information, such as factors that indicate the interest level of the users in the information, the rate of change of the information, and whether the information is associated with a deadline or other significant time event. In one example, in a bidding system, the polling rate may be determined based on the number of unique bidders for an item, the current price of the item, and the deadline for bids. In a second example, such as for stock, bond, or option trading, the frequency may be based on recent price changes, number of bids, number of offers, recent news releases, time until end of the trading session, or other informational factors. As yet another example, a news feed of current items may be updated and based on a calculated efficient update frequency. The analysis of the information may be performed by a system including a machine learning component that is trained to determine an optimal rate at which user devices should be refreshed with the latest information, and yet be efficient on server and/or data center operations.

The described techniques enable users to receive or access updated information in a timely manner without, for example, the user having to unnecessarily refresh the viewing application, thus providing a better user experience. In some embodiments, technologies are disclosed for using a machine learning model to predict an optimal polling and refresh frequency based on various selected data. For example, on a webpage providing bidding information for an auction item, an adaptive timing prediction based on the machine learning model may be used to determine when to update bid information on the page. The bid information may include, for example, the current bid price, the number of bidders, and the remaining time. Based on a selected set of properties, such as properties associated with time, the item, and the user, an optimal timing prediction may be determined and used to reduce the frequency of update calls to a polling function when frequent updates to the page are not necessary, or to increase the frequency of update calls where higher update rates may be needed for data consistency (e.g., in scenarios such as with items that have frequent bids or is approaching a time limit).

The disclosed technologies address the technical problems presented above, and potentially others, by polling for information updates and providing the updates at a rate that is suitable for a given scenario, thus providing users with information that increase their level of interest and participation in a given activity. The disclosed technologies also allow for reduction of the amount of unnecessary polls and information updates, thus reducing the waste of computing resources (e.g., amount of memory or number of processor cycles required to maintain a faster poll rate) and network bandwidth (because each call requires network use). Other technical benefits not specifically mentioned herein can also be realized through implementations of the disclosed technologies.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

The following Detailed Description presents technologies for optimizing when and how frequently a dynamically updated information source should be polled and pushed to users of the information. As discussed briefly above, and in greater detail below, the disclosed technologies can enable users to receive or access updated information in a timely manner without, for example, unnecessarily refreshing the viewing application, providing a better user experience. The disclosed technologies can also enable reduction of the amount of unnecessary polls and information updates, which can result in improved utilization and performance of computing resources. Technical benefits other than those specifically mentioned herein might also be realized through implementations of the disclosed technologies.

It is to be appreciated that while the technologies disclosed herein are primarily described in the context of bidding systems, the technologies described herein can be utilized to optimize polling and pushing of a dynamically updated information source in other configurations, which will be apparent to those of skill in the art. For example, the described techniques can be used in the updating of stock price information or monitored data in an operations dashboard.

Referring now to the appended drawings, in which like numerals represent like elements throughout the several figures, aspects of various technologies for will be described. In the following detailed description, references are made to the accompanying drawings that form a part hereof, and which are shown by way of illustration specific configurations or examples.

In the example of an online bidding system, when the bidding time period is approaching its end, users tend to bid more during the final few minutes before the bidding ends. The current price/next bid price of the item as well as the status of other bidders based on the bidding activity may be frequently updated during this time. An online bidding service provider may implement a polling function to obtain the most current information and push the information to users who are participating in the bidding. For example, a user update function may access the latest bidding status information from a database and send out the updates to the users. The online bidding service provider may need to implement this functionality across multiple pages for multiple items and products as well as on multiple platforms such as web pages and native clients. Some bidding systems may poll for details every few seconds based on the time left for a particular bidding activity to end. In some cases, the bidding system may implement two polling frequencies, one for normal updates, and a more frequent polling frequency during the final few minutes (or some other time period).

Figure 1:
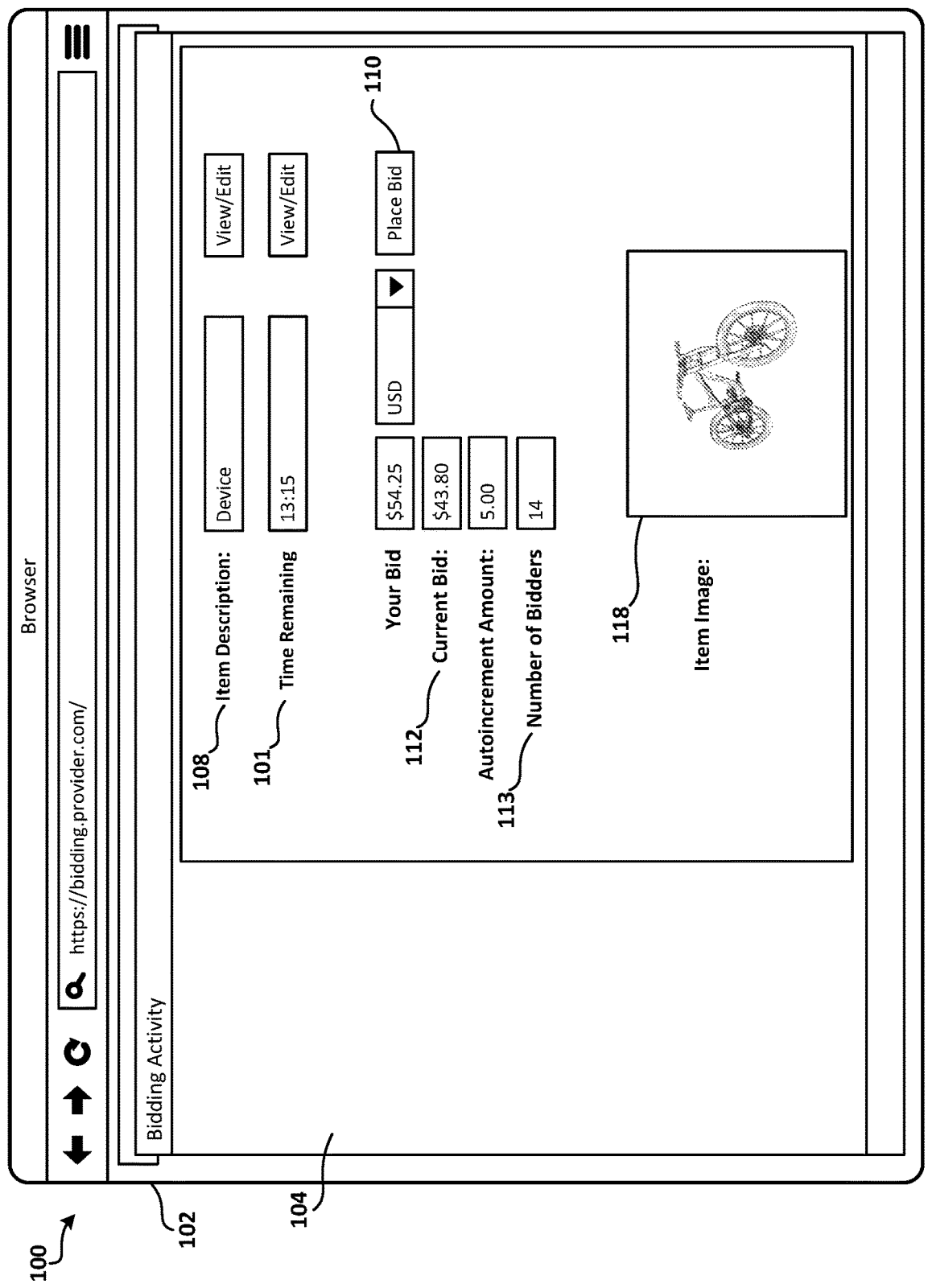
FIG. 1 is an example user interface diagram showing aspects of an illustrative user interface disclosed herein for viewing the results of a bidding system using the technologies disclosed herein.

FIG. 1 illustrates one example of a display 100 that may be used to provide updated information to a user. The display 100 may render a browser window 102 that may be rendering a bidding activity page 104. The bidding activity page 104 may include information pertaining to a particular item that is subject to a bidding or auction process, and may include information such as the item description 108, item image 118, time remaining 101, number of bidders 113, and the current bid 112. The bidding activity page 104 may further provide a user with the ability to submit a bid 110 for the item. The time remaining 101, number of bidders 113, and the current bid 112 may be important information that may influence a user's level of interest in the item, the user's decision to enter a bid, as well as the bid amount. Therefore, it is important for this information to be as current as possible so that the information relied upon by the user to place a bid is accurate.

In various embodiments, a prediction may be determined as to when information should be polled to present updated information to the user. In an example scenario, a centralized database may store the user bids for a given item. A polling function may be used to query the database for the latest information and send the information to users who are viewing the information, for example on their web browser. If the polling function is invoked too frequently, then the queries will not result in new information, resulting in inefficient utilization of network and computing resources. If the polling function is invoked at a slow rate, then the users may be not updated with the most current bid information, possible resulting in unsuccessful bids or incorrect bids, which can lead to user dissatisfaction and possible loss of user participation. If the prediction for the polling frequency provides timely and accurate information, user satisfaction and confidence in the information may be enhanced. In some cases, user participation may be increased based on the new information being provided in a timely and responsive manner.

In one embodiment, a machine learning model may be implemented to determine timing and frequency for when to invoke the polling function to update bid information. The machine learning model may enable determination of an adaptive timing prediction that is based on one or more factors. The factors may be associated with time, such as the amount of time remaining in the bidding period, the current date and time, and whether it is currently a weekend or weekday. The factors may also be associated with the item such as price of the item, the type of the item, and the number of bidders who are interested in the item. The factors may also be associated with the user, such as the bidding history of the user and other information that are unique for the user. The adaptive timing prediction may reduce the number of unnecessary calls to the polling function where frequent updates to the page are not necessary. In other cases, the adaptive timing prediction may increase the number of calls to the polling function where a higher update frequency is needed to maintain data consistency (e.g., in scenarios with a high number of bids or the bidding end time is approaching).

As used in this disclosure, the updated information that is to be polled and pushed to users may generally be referred to as subscribed information or variable information.

In an embodiment, an adaptive timing prediction machine learning model may be implemented with a feedback loop to update the predictions based on currently available data. For example, to the extent that users refresh the browser, it may indicate that the refresh rate is too small. Some examples of data that may be used by the adaptive timing prediction machine learning model may include the following properties:

Time remaining: this property may be associated with items where a time limit is included, such as the time remaining for an item in a bidding system, or the time remaining until the end of a business day. In many cases, the information to be polled may be updated more frequently as the time remaining approaches zero. For example, in a bidding system, the number of bids and the number of bidding users attempting to bid for an item may significantly increase as the time remaining approaches zero. The polling frequency may thus be continuously increased based on the time remaining.

Number of bids: this property may be associated with a total number of bids on an item from all bidders. The total number of bids may indicate that the information of interest will be updated more frequently, and the polling frequency may thus be increased to maintain data consistency for the users who are currently bidding for the item. In scenarios other than a bidding system, the total number of bids may correspond to the total number of requests or user interactions that may result in an update to the variable information.

Number of unique bidders: this property may be associated with the total number of unique users who have submitted bids for an item. This may generally indicate that the item is in high demand and that many users are interested in purchasing the item. In some embodiments, a further property may be associated with the total number of users who are obtaining information for the item or are "watching" the item. This may indicate a level of interest that may be different from the level of interest from actual bidders, but may nevertheless be useful in determining a level of interest in an item. In scenarios other than a bidding system, the total number of unique bidders may correspond to the total number of users who have requested information or the total number of users who are actively participating in a manner that may result in an update to the variable information.

Dwell time of the user on a page: In some embodiments, this property may be associated with the average time that users spend on the item page to read item details. A higher dwell time may generally indicate that a particular user is more interested in buying that item. In some embodiments, a further property may be associated with the number of times that a user has visited the page or other properties that may indicate a level of interest in a page.

Current set of active bidders in recent time window: this property may be associated with the total number of users who have submitted bids for an item with a recent time window. This may generally indicate that the level of activity resulting in updated information may have significantly increased, and may result in an increasing frequency of updates to the variable information.

Current set of active bidders during a period of time: this property may be associated with the current set of active bidders during a selected time period, such as the last 10 minutes before the end of the bidding period, the last 1 hour before the end of the bidding period, the last 12 hours before the end of the bidding period, and the last 24 hours before the end of the bidding period. The number of active bidders over a selected time window may be indicative of varying levels of interest and activity that may be used to predict a polling frequency. In some embodiments, a time-based distribution of active bidders may be used to predict a polling frequency.

Time-based contextual factors: this property may be associated with specific information pertaining to date and time such as whether it is currently a weekend or weekday, whether it is a morning or early evening, and whether it is currently a holiday. Weekends and holidays may have high bidding rates compared to regular weekdays, and afternoons and early evenings may have higher bidding rates compared to the early morning hours.

Other features that may be used in the machine learning model may include:

Price of the item: extremely high-priced or low-priced items may have different levels of interest.

Returns accepted: the ability of a winning bidder to return an item may increase the level of bidding activity.

Seller feedback: the availability of seller feedback as well as the average rating for a seller may influence the amount of bidding activity for an item.

In other systems, other features may be used. As stated previously, in a stock, bond, or option trading system, the time until the end of the session may be a feature. A recent news release, such as an earnings announcement, may be a feature describing a desirability to increase a refresh rate. For a news or informational push system, a ranking on the likely importance of a news item may be a feature that may be used to predict an optimal refresh rate.

Figure 2:
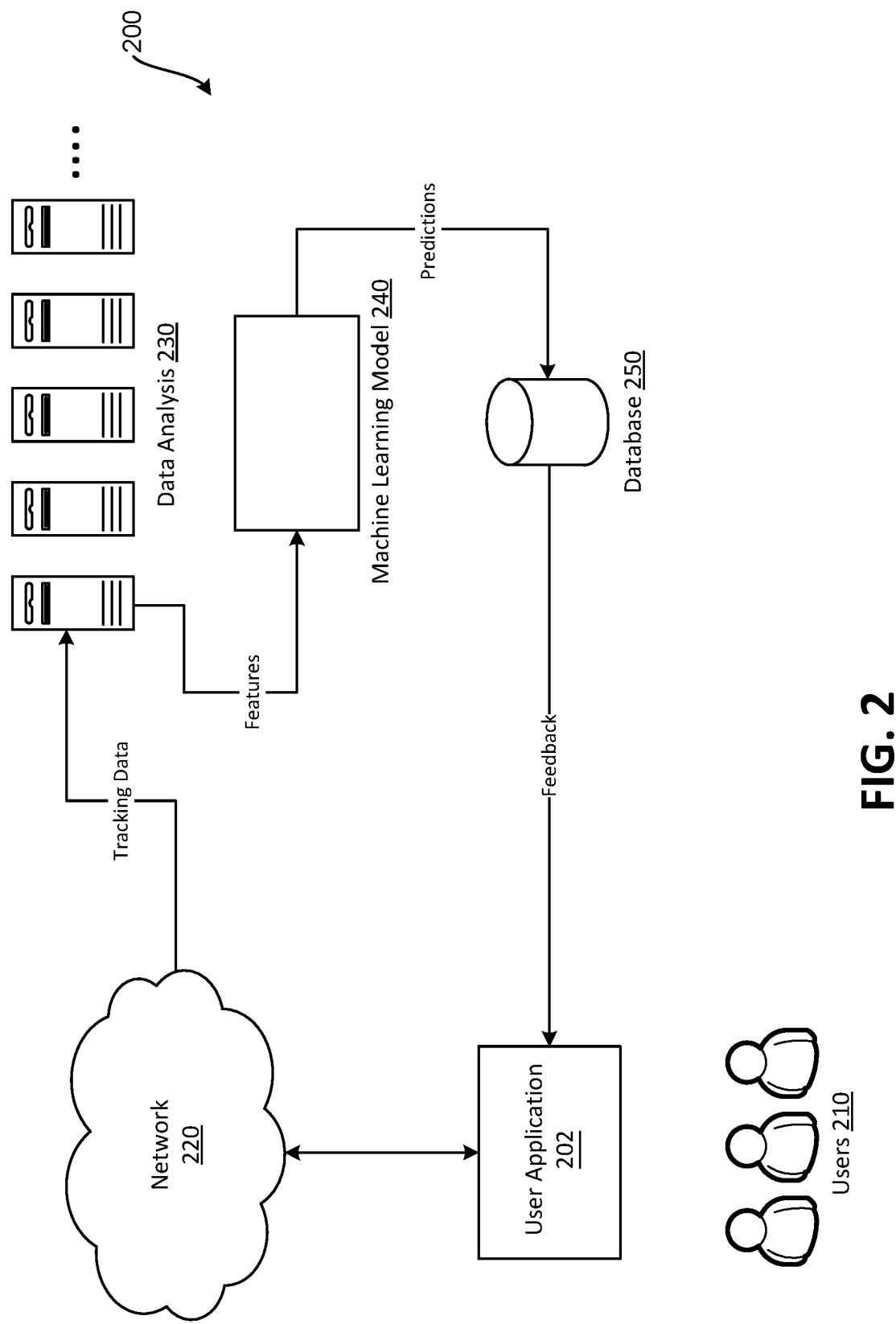
FIG. 2 is an example computing system architecture diagrams showing aspects of a system disclosed herein for providing polling predictions, according to one embodiment disclosed herein.

FIG. 2 is a computing system architecture diagram showing an overview of a system disclosed herein for an adaptive timing prediction system, according to one embodiment disclosed herein. As shown in FIG. 2, an adaptive timing prediction system 200 (which might also be referred to herein as an "timing prediction system" or as a "prediction component") may be configured to predict polling frequencies based upon various user tracking data ("tracking data") generated by data analysis components 230 (which might be referred to individually as an "data analysis component 230" or collectively as the "data analysis components 230").

The data analysis components 230 may, for example, include Hadoop utilities. The data analysis components 230 may, for example, include, but are not limited to, physical computing devices such as server computers or other types of hosts, associated hardware components (e.g. memory and mass storage devices), and networking components (e.g. routers, switches, and cables). The data analysis components 230 can also include software, such as operating systems, applications, and containers, network services, virtual components, such as virtual disks, virtual networks, and virtual machines. The database 250 can include data, such as a database, or a database shard (i.e. a partition of a database). The feedback may be used to predict a polling frequency that is used to update the user application 202 that provide the updated information to various users 210.

Figure 3:
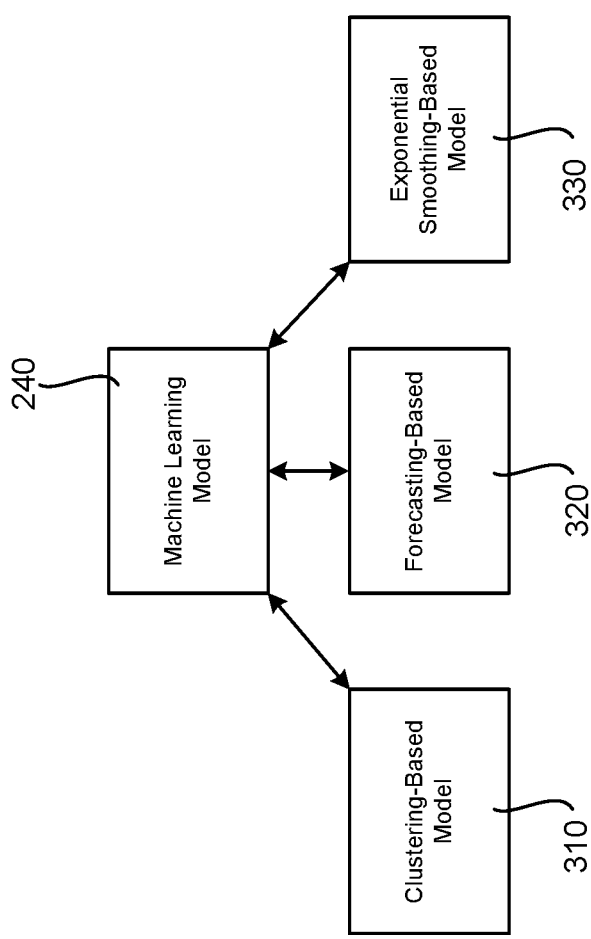
FIG. 3 is an example computing system architecture diagrams showing aspects of a system disclosed herein for providing polling predictions, according to one embodiment disclosed herein.

In some configurations, a machine learning model 240 may be configured to utilize supervised and/or unsupervised machine learning technologies to predict polling frequencies. For example, the machine learning model 240 may utilize supervised machine learning techniques by training on tracking data that describes various user and bidding data as described herein. As shown in FIG. 3, the machine learning model 240 may also, or alternately, utilize unsupervised machine learning techniques to predict polling frequencies including, but not limited to, a clustering-based model 310, a forecasting-based model 320, a smoothing-based model 330, or another type of unsupervised machine learning model.

In some embodiments, the tracking data may be analyzed to identify trends and patterns related to polling frequencies and determine which frequencies may influence user behavior and interaction, and in some cases, which polling frequencies may be related to an increased likelihood of user behavior such as increasing the likelihood of bidding for an item. In one embodiment, the machine learning model 240 may incorporate a classification function that may be configured to determine which user data patterns and polling frequencies are relevant for a particular objective. The classification function may, for example, continuously learn which user data patterns and polling frequencies are relevant to a various potential outcomes. In some embodiments, supervised learning may be incorporated where the machine learning model may classify observations made from various user inputs, item characteristics, and polling frequencies. The machine learning model may assign metadata to the observations. The metadata may be updated by the machine learning model to update relevance to the objectives of interest as new observations are made and assign tags to the new observations. The machine learning model may learn which observations are alike and assign metadata to identify these observations. The machine learning model may classify future observations into categories.

In some embodiments, an algorithm, such as a feature subset selection algorithm or an induction algorithm, may be implemented to define groupings or categories. Probabilistic approaches may also be incorporated. One or more estimation methods may be incorporated, such as a parametric classification technique. In various embodiments, the machine learning model may employ a combination of probabilistic and heuristic methods to guide and narrow the data that are analyzed.

In order to provide relevant results that are more likely to indicate outcomes for a particular observed pattern of data, the most relevant patterns may be identified and weighted. In some embodiments a heuristic model can be used to determine polling frequencies that provide an acceptable confidence level in the results. For example, experience-based techniques, such as expert modeling can be used to aid in the initial selection of parameters. The heuristic model can probabilistically indicate parameters of likely impact through, for example, tagging various metadata related to a particular pattern. Feedback from an initial round of analysis can be used to further refine the initial selection, thus implementing a closed loop system that generates likely candidates for polling frequencies in situations where programmatic approaches may be impractical or infeasible. As an example, Markov modeling or variations thereof (e.g., hidden Markov model and hierarchical hidden Markov model) can be used in some embodiments to identify candidate polling frequencies that may otherwise be missed using traditional methods.

As shown in FIG. 2, the machine learning model 240 can generate predictions (which might be referred to herein simply as a "prediction") based on features extracted from the user and bidding information. The predictions can be provided in various forms, such as a single polling frequency, or a schedule of polling frequencies that may change over time.

Figure 4:
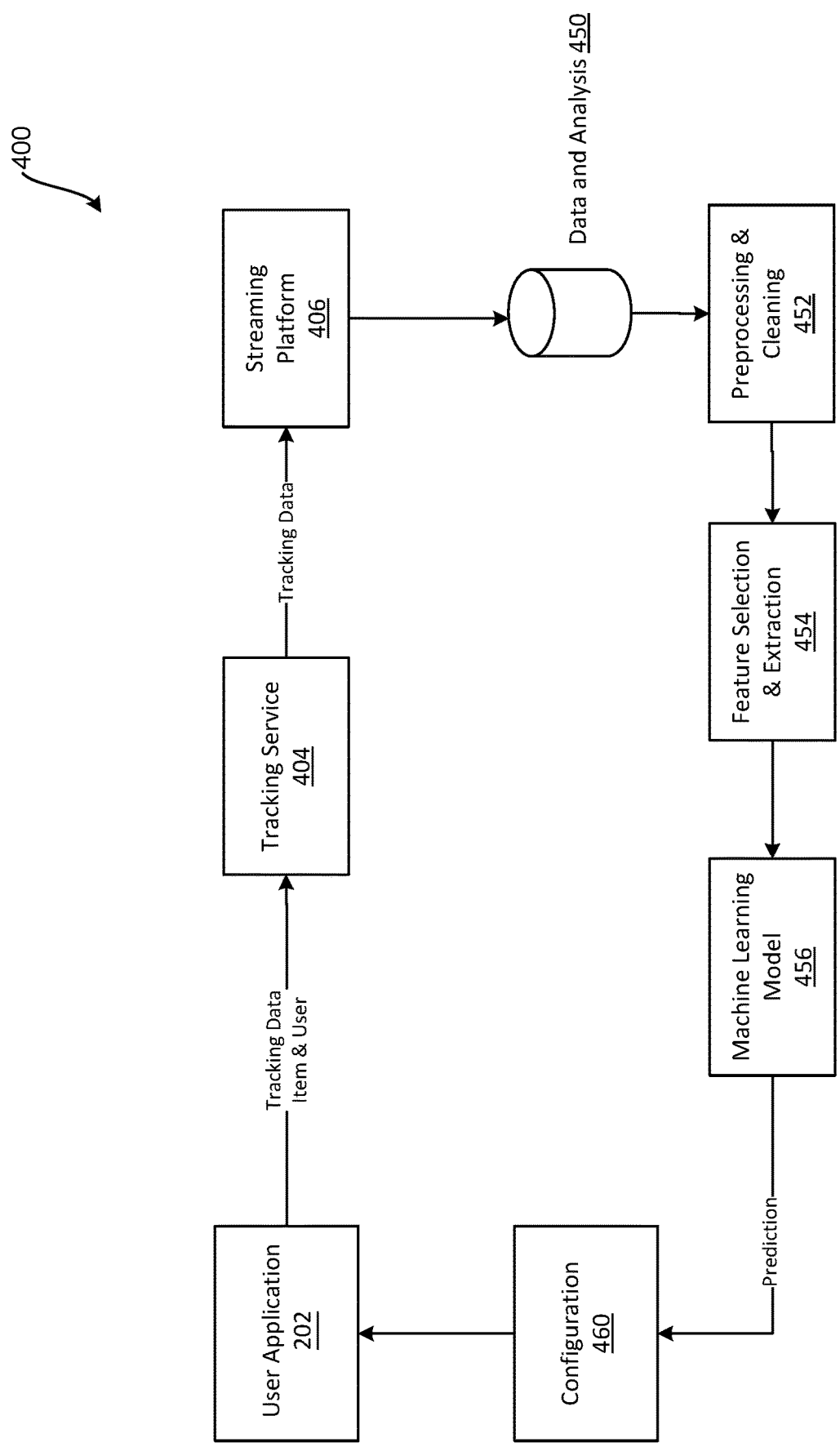
FIG. 4 is an example computing system architecture diagrams showing aspects of a system disclosed herein for providing polling predictions, according to one embodiment disclosed herein.

FIG. 4 is a computing system architecture diagram showing an overview of a system disclosed herein for an adaptive timing prediction system, according to one embodiment. As shown in FIG. 4, an adaptive timing prediction system 400 may be configured to predict polling frequencies based upon tracking data generated by tracking service 404 and received from user application 202.

The tracking service 404 may send selected tracking data to a streaming platform 406. Such a streaming platform may be implemented using a Kafka pipeline, in one implementation. Data streams may be provided to a data storage component and analysis component 450 that may, for example, include Hadoop utilities. The data and analysis component 450 may provide data for a preprocessing and cleaning component 452 that may be configured to process the stored data. The processed data may be provided to a feature selection and extraction component 454 that may be configured to select data and properties for a given item, user, and the like. The processed data may be provided to machine learning model 456 that may use the data and properties to generate a prediction for a polling frequency and send the prediction to configuration system 460. In some embodiments, the configuration system 460 may be implemented as a distributed key-value database such as Redis.

In some configurations, the machine learning model 456 may be configured to utilize supervised and/or unsupervised machine learning technologies to predict polling frequencies. For example, the machine learning model 456 may utilize supervised machine learning techniques by training on tracking data that describes various user and bidding data as described herein. The machine learning model 456 can generate predictions based on features extracted from the user and bidding information. The predictions can be provided in various forms, such as a single polling frequency, or a schedule of polling frequencies that may change over time.

Figure 5:
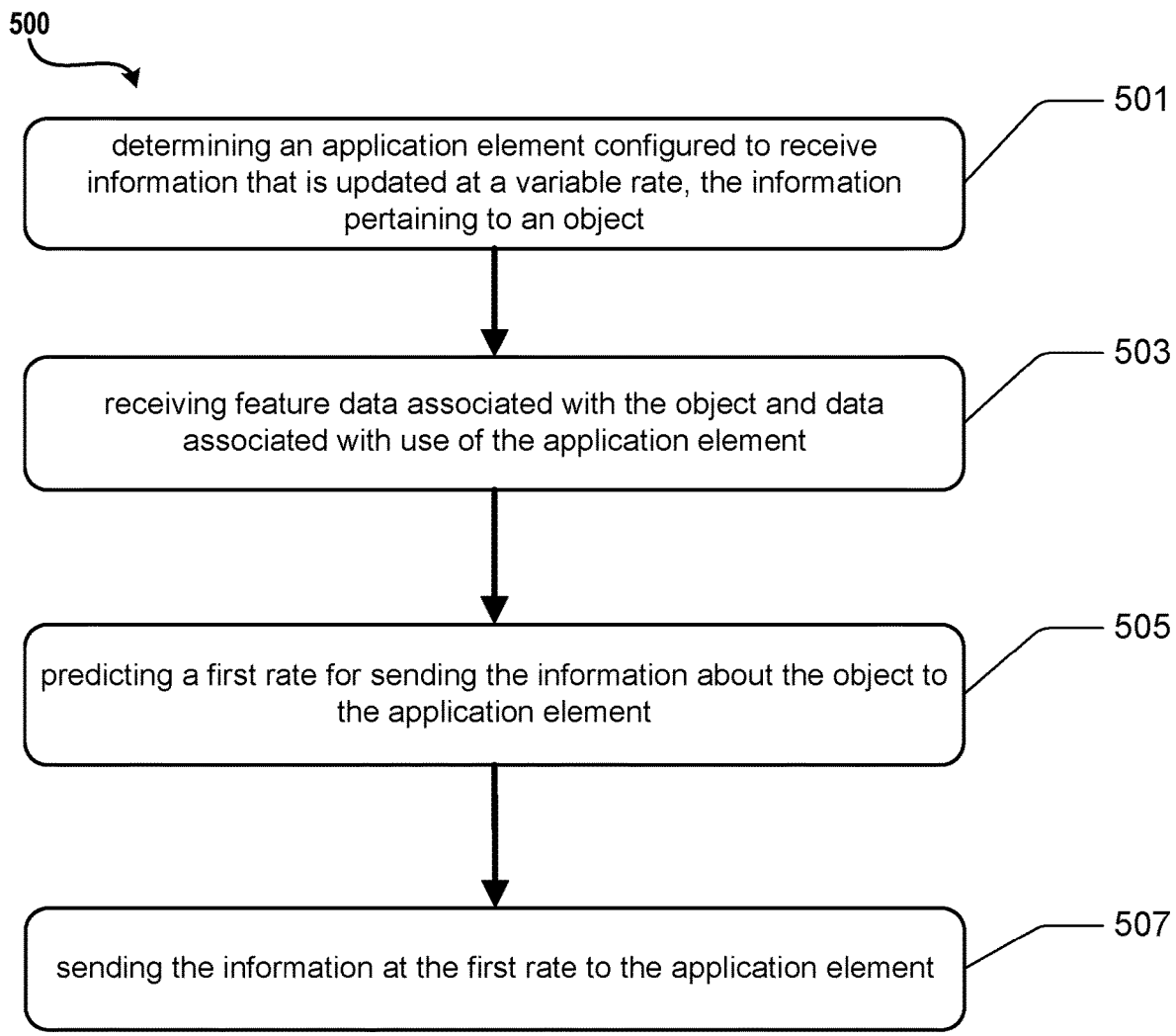
FIG. 5 is an example flow diagram showing aspects of an illustrative routine for providing polling predictions, according to one embodiment disclosed herein.

FIG. 5 is a diagram illustrating aspects of a routine 500 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 500 begins at operation 501, which illustrates determining an application element configured to receive information that is updated at a variable rate, the information pertaining to an object.

The routine 500 then proceeds to operation 503, which illustrates receiving feature data associated with the object and data associated with use of the application element. In an embodiment, the feature data includes a time horizon for the object and supplemental information associated with the object.

Operation 505 illustrates based on the feature data and the data associated with use of the application element, predicting a first rate for sending the information about the object to the application element.

Next, operation 507 illustrates sending the information at the first rate to the application element.

In an embodiment, the data associated with use of the application element comprises a number of users of the information.

In an embodiment, the information is described by a web page.

In an embodiment, the supplemental information comprises a value of the object.

In an embodiment, the supplemental information comprises a value of the object. In some embodiments, the object is a commodity and the value is a current market price. In some embodiments, the object is an item in a bidding system and the value is a bid price for the item In an embodiment, the time horizon is a deadline defined by a date and time.

In an embodiment, the first rate is predicted by a machine learning component. Additionally and optionally, the machine learning component is trained using unsupervised learning to determine associations between the feature data and data associated with use of the application element; and supervised learning to predict the first rate.

In an embodiment, a second rate for reading the information may be predicted.

Figure 6:
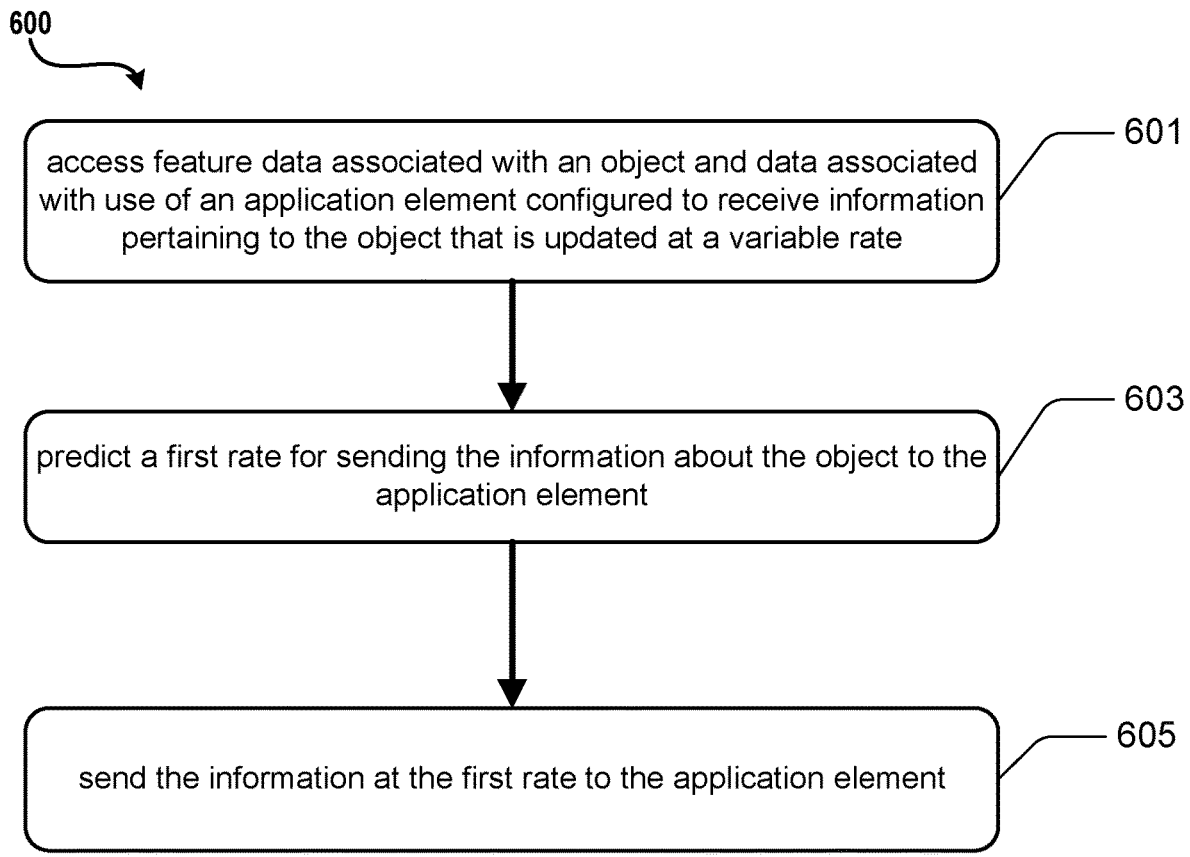
FIG. 6 is an example flow diagram showing aspects of an illustrative routine for providing polling predictions, according to one embodiment disclosed herein.

FIG. 6 is a diagram illustrating aspects of a routine 600 for implementing some of the techniques disclosed herein.

The routine 600 begins at operation 601, which illustrates accessing feature data associated with an object and data associated with use of an application element configured to receive information pertaining to the object that is updated at a variable rate. In an embodiment, the feature data include a time horizon for the object and supplemental information associated with the object.

The routine 600 then proceeds to operation 603, which illustrates based on the feature data and the data associated with use of the application element, predicting a first rate for sending the information about the object to the application element.

Operation 605 illustrates sending the information at the first rate to the application element.

Figure 7:
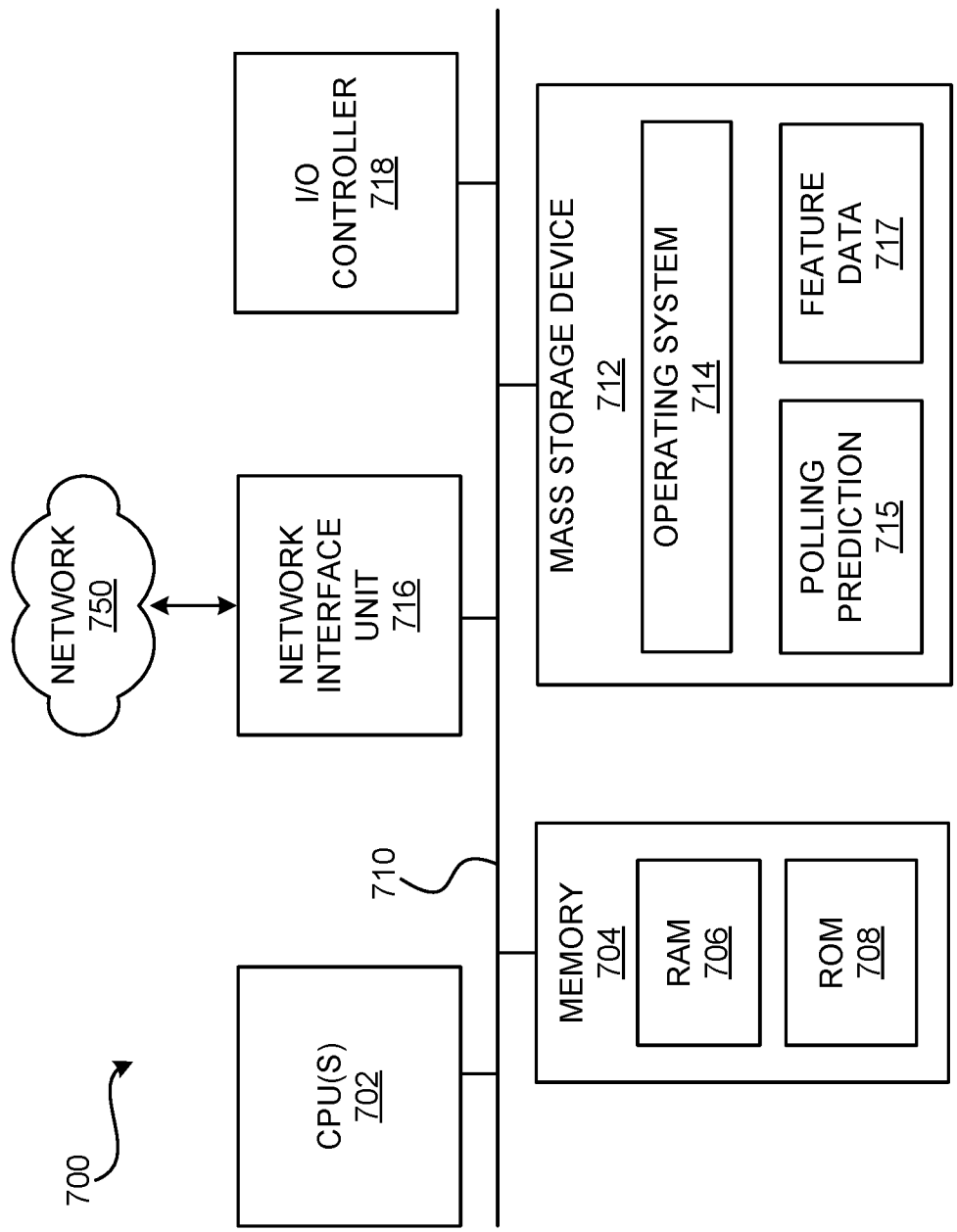
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, and one or more executable programs, such as programs for implementing polling prediction 715 and storing feature data 717.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 710. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7). It should also be appreciated that via a connection to the network 750 through a network interface unit 716, the computing architecture might enable the product of the prefetch engine 108 to be distributed.

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
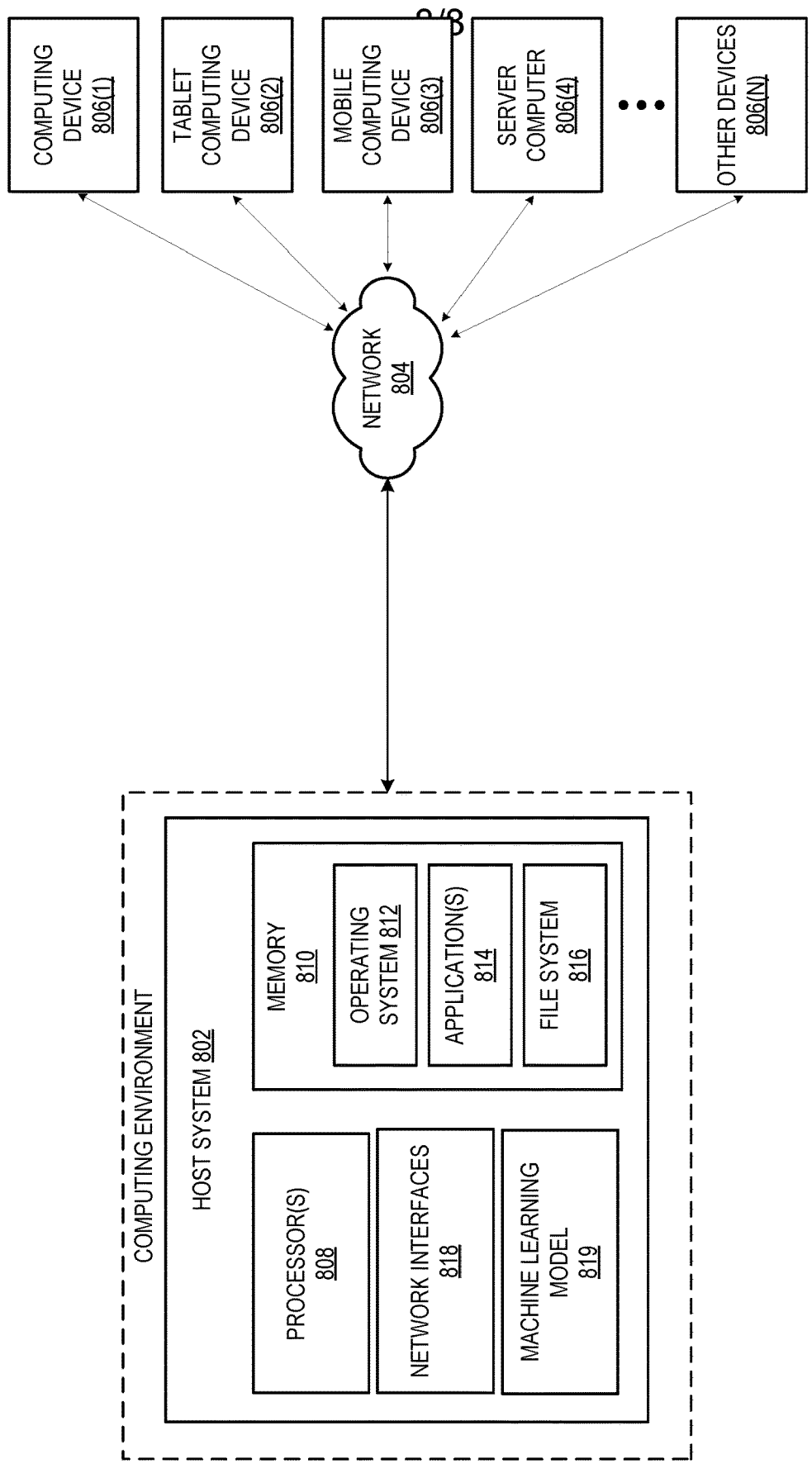
FIG. 8 is a data architecture diagram showing an illustrative example of a computer environment.

FIG. 8 illustrates an example computing environment capable of executing the techniques and processes described above with respect to FIGS. 1-7. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include processor(s) 1208 memory 810. The memory 810 can comprise an operating system 812, application(s) 814, and/or a file system 816. Moreover, the memory 810 can comprise the storage unit(s) 82 described above with respect to FIGS. 1-7.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices. A machine learning model 819 may be implemented.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method implemented by a computing device, the method comprising:
   obtaining, by the computing device, feature data of user data associated with use of a user application and of item data associated with one or more items of the user application;
   training, by the computing device, a machine learning component with the feature data to generate one or more polling frequencies predicted to increase a likelihood of an objective of the user application;
   receiving, by the computing device, different feature data associated with an item of the user application and element data associated with use of an application element of the user application, the application element configured to receive polled information associated with the item at a variable rate;
   determining, by the computing device, via the machine learning component, one or more associations between the feature data and the element data;
   generating, by the computing device, via the machine learning component, based at least in part on the different feature data, the element data, and the one or more associations between the feature data and the element data, a polling frequency predicted to increase the likelihood of the objective of the user application; and
   invoking, by the computing device, a polling function to send, to the application element, the polled information at the polling frequency predicted to increase the likelihood of the objective of the user application.

2. The method of claim 1, wherein the training of the machine learning component is via unsupervised learning.

3. The method of claim 1, wherein the training of the machine learning component is via supervised learning.

4. The method of claim 3, further comprising obtaining, by the computing device, tracking data including the user data associated with the use of the user application and bidding data, and wherein the training of the machine learning component via the supervised learning is with the tracking data.

5. The method of claim 4, wherein the machine learning component identifies, one or more patterns related to the tracking data that are relevant to the objective, and the generating of the polling frequency is based at least in part on the one or more patterns identified.

6. The method of claim 1, wherein the objective is a user behavior.

7. The method of claim 6, wherein the user behavior is bidding for the item by one or more users of the user application.

8. The method of claim 1, wherein the machine learning component includes at least one of a clustering-based model, a forecasting-based model, or a smoothing-based model.

9. The method of claim 1, wherein the user data associated with the use of the application element includes a number of users of the polled information.

10. A computing system, comprising:
one or more processors; and
a computer-readable storage medium having computer-executable instructions that are executable by the one or more processors to perform operations including:
obtaining feature data of user data associated with use of a user application and of item data associated with one or more items of the user application;
training a machine learning component with the feature data to generate one or more polling frequencies predicted to increase a likelihood of an objective of the user application;
receiving different feature data associated with an item of the user application and element data associated with use of an application element of the user application, the application element configured to receive polled information associated with the item at a variable rate;
determining, via the machine learning component, one or more associations between the feature data and the element data;
generating, via the machine learning component, a polling frequency predicted to increase the likelihood of the objective of the user application based at least in part on the different feature data, the element data, and the one or more associations between the feature data and the element data; and
invoking a polling function to send, to the application element, the polled information at the polling frequency predicted to increase the likelihood of the objective of the user application.

11. The computing system of claim 10, wherein the different feature data includes a time horizon for the item.

12. The computing system of claim 10, wherein the different feature data includes supplemental information associated with the item.

13. The computing system of claim 10, wherein the training of the machine learning component is via unsupervised learning.

14. The computing system of claim 10, wherein the objective is a user behavior.

15. The computing system of claim 10, the operations further including obtaining tracking data including the user data associated with the use of the user application and bidding data, and wherein the training of the machine learning component is with the tracking data.

16. The computing system of claim 15, wherein the generating the polling frequency is based at least in part on one or more patterns identified by the machine learning component that are related to the tracking data and relevant to the objective.

17. A non-transitory computer-readable storage medium having computer-executable instructions that are executable by a computing device to perform operations comprising:
obtaining feature data of user data associated with use of a user application and of item data associated with one or more items of the user application, and tracking data that includes the user data and bidding data;
training a machine learning component with the feature data to generate one or more polling frequencies predicted to increase a likelihood of an objective of the user application;
receiving different feature data associated with an item of the user application and element data associated with use of an application element of the user application, the application element configured to receive polled information associated with the item at a variable rate;
generating via the machine learning component, based on the different feature data, the element data, and one or more patterns identified by the machine learning component that are related to the tracking data and relevant to the objective, a polling frequency predicted to increase the likelihood of the objective of the user application; and
invoking a polling function to send, to the application element, the polled information at the polling frequency predicted to increase the likelihood of the objective of the user application.

18. The non-transitory computer-readable storage medium of claim 17, wherein the training of the machine learning component is via supervised learning.

19. The non-transitory computer-readable storage medium of claim 18, wherein the training of the machine learning component via the supervised learning is with the tracking data.

20. The non-transitory computer-readable storage medium of claim 17, the operations further comprising determining, via the machine learning component, one or more associations between the feature data and the element data, wherein the generating the polling frequency is based at least in part on the one or more associations between the feature data and the element data.

* * * * *